(12) United States Patent
Nong et al.

(10) Patent No.: US 11,287,006 B2
(45) Date of Patent: Mar. 29, 2022

(54) EMERGENCY AIR SPRING ASSEMBLY

(71) Applicant: ZHUZHOU TIMES NEW MATERIAL TECHNOLOGY CO., LTD., Hunan (CN)

(72) Inventors: Duomin Nong, Hunan (CN); Te Ye, Hunan (CN); Canhui Chen, Hunan (CN); Haitao Cheng, Hunan (CN); Jun Zhou, Hunan (CN); Qiang Chen, Hunan (CN); Guoqi Duan, Hunan (CN); Qinghua Chen, Hunan (CN); Yaokun Long, Hunan (CN)

(73) Assignee: ZHUZHOU TIMES NEW MATERIAL TECHNOLOGY CO., LTD., Hunan (CN)

( * ) Notice: Subject to any disclaimer, the term of this patent is extended or adjusted under 35 U.S.C. 154(b) by 185 days.

(21) Appl. No.: 16/648,234

(22) PCT Filed: Aug. 2, 2018

(86) PCT No.: PCT/CN2018/098205
§ 371 (c)(1),
(2) Date: Mar. 18, 2020

(87) PCT Pub. No.: WO2019/080575
PCT Pub. Date: May 2, 2019

(65) Prior Publication Data
US 2020/0217387 A1 Jul. 9, 2020

(30) Foreign Application Priority Data
Oct. 27, 2017 (CN) .......................... 201711021632.6

(51) Int. Cl.
*F16F 9/05* (2006.01)
*F16F 13/00* (2006.01)
*F16F 9/04* (2006.01)

(52) U.S. Cl.
CPC .............. *F16F 9/05* (2013.01); *F16F 13/002* (2013.01); *B60G 2202/152* (2013.01);
(Continued)

(58) Field of Classification Search
CPC ...... F16F 9/0454; F16F 13/002; F16F 9/3207; F16F 15/085; F16F 9/049; F16F 9/05;
(Continued)

(56) References Cited

U.S. PATENT DOCUMENTS 3,806,106 A * 4/1974 Hamel ..................... F16F 1/371
267/152
4,294,175 A * 10/1981 Harsy ....................... B61F 5/16
105/199.3
(Continued)

FOREIGN PATENT DOCUMENTS

CN 103395429 11/2013
CN 205854162 1/2017
(Continued)

OTHER PUBLICATIONS

"International Search Report (Form PCT/ISA/210) of PCT/CN2018/098205," dated Oct. 8, 2018, with English translation thereof, pp. 1-6.

*Primary Examiner* — Pamela Rodriguez
(74) *Attorney, Agent, or Firm* — JCIP Global Inc.

(57) ABSTRACT

An emergency air spring assembly includes an upper cover plate, an air bag, an upper end plate and a lower end plate. An outer periphery of the upper end plate is connected with an outer periphery of the lower end plate through the air bag. An hourglass elastomer is connected between the upper cover plate and the upper end plate. A plurality of steel springs are arranged between the upper cover plate and the upper end plate in a circumferential direction of the sand clock elastomer in a pressing mode.

12 Claims, 1 Drawing Sheet

(52) U.S. Cl.
CPC ............... *B60G 2204/4502* (2013.01); *B60G 2206/424* (2013.01); *B60G 2300/10* (2013.01); *F16F 9/0454* (2013.01)

(58) Field of Classification Search
CPC .............. F16F 9/052; B60G 2202/152; B60G 2204/4502; B60G 2206/424; B60G 2300/10
See application file for complete search history.

(56) References Cited

U.S. PATENT DOCUMENTS

| | | | | |
|---|---|---|---|---|
| 4,690,388 | A * | 9/1987 | Harrison | B60G 7/04 |
| | | | | 267/35 |
| 5,111,735 | A * | 5/1992 | Johnson | D21F 3/06 |
| | | | | 91/433 |
| 5,950,544 | A * | 9/1999 | Bieker | B61F 5/144 |
| | | | | 105/453 |
| 6,102,378 | A | 8/2000 | Gieseler et al. | |
| 11,073,189 | B2 * | 7/2021 | Nong | F16F 13/002 |
| 2015/0175176 | A1 * | 6/2015 | Sato | F16F 9/58 |
| | | | | 105/198.1 |
| 2020/0208703 | A1 * | 7/2020 | Chen | F16F 13/002 |
| 2020/0217388 | A1 * | 7/2020 | Nong | F16F 15/085 |
| 2020/0217390 | A1 * | 7/2020 | Ye | F16F 9/057 |

FOREIGN PATENT DOCUMENTS

| | | |
|---|---|---|
| CN | 206206472 | 5/2017 |
| CN | 107740837 | 2/2018 |
| CN | 207364173 | 5/2018 |
| GB | 1232121 | 5/1971 |

* cited by examiner

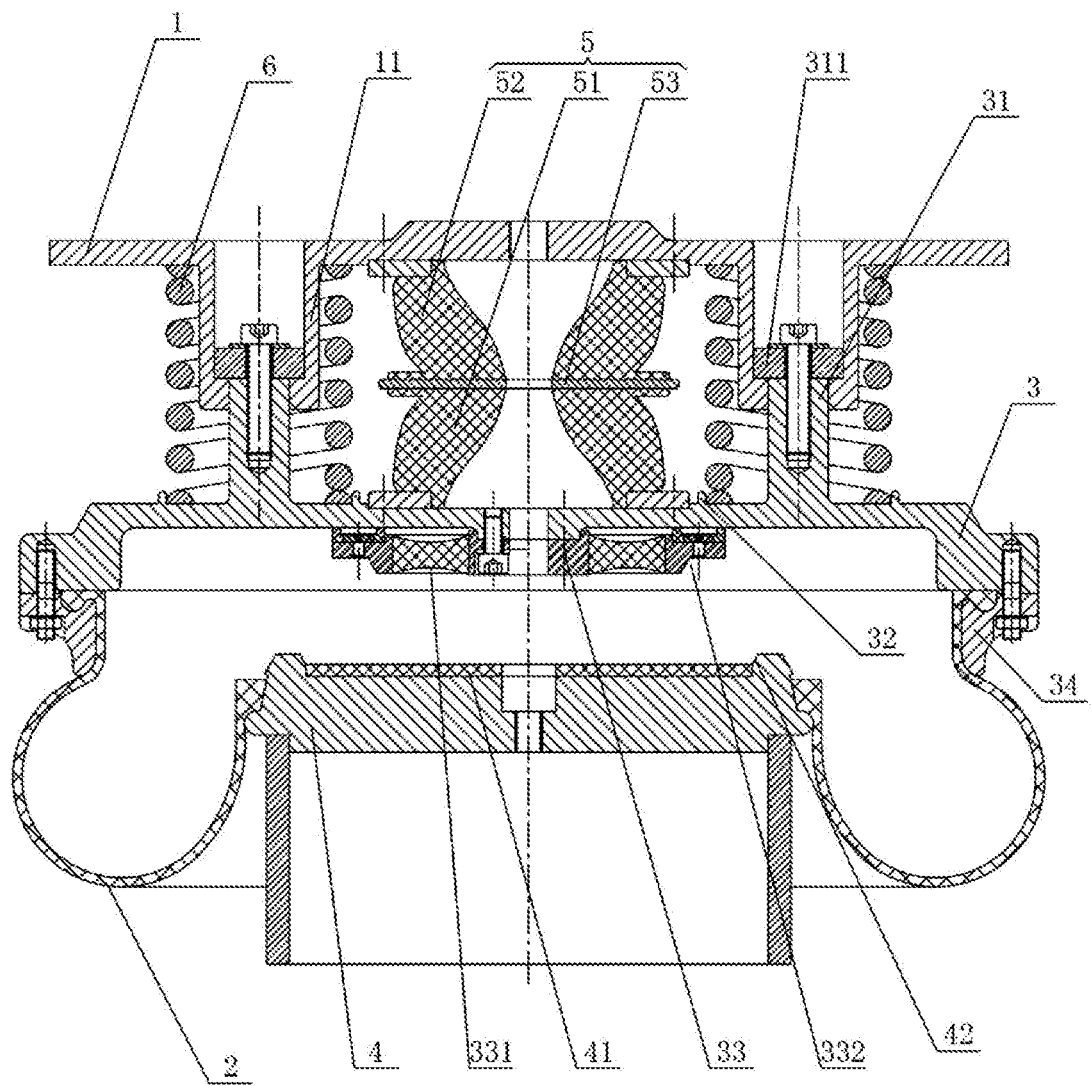

EMERGENCY AIR SPRING ASSEMBLY

CROSS-REFERENCE TO RELATED APPLICATION

This application is a 371 of international application of PCT application serial no. PCT/CN2018/098205, filed on Aug. 2, 2018, which claims the priority benefit of China application no. 201711021632.6, filed on Oct. 27, 2017. The entirety of each of the above mentioned patent applications is hereby incorporated by reference herein and made a part of this specification.

BACKGROUND

Technical Field

The invention mainly relates to the buffering and damping technology, more particularly relates to an emergency air spring assembly.

Description of Related Art

The air spring assembly is widely applied in railway cars, overload vehicles and other important buffering or damping occasions. Usually, this spring assembly comprises an elastomer located between a pair of rigid end plates. The elastomer is made of rubber, and compressed by loads acted on the spring assembly. In the prior art, the rubber emergency spring will generate creep deformation during the service life due to the characteristics of rubber, and meanwhile the vertical rigidity will increase due to the nonlinearity of rubber when loads are increased. In some high speed train projects, the emergency spring is required to have small vertical rigidity change, large dynamic displacement and no padding during the life. Thus, the existing rubber emergency spring cannot meet this requirement.

When the air spring is deflated, hard stop will be generated in the vertical direction generally, and meanwhile transverse sliding friction will occur between the cover plate and the wearing plate, which cannot meet the rigidity requirement and the soft stop requirement of some high speed train projects in the transverse direction in the deflated state.

SUMMARY

The objects in the invention is in view of the abovementioned problems of the prior art, and provide an emergency air spring assembly which is simple in structure, convenient to install, low in heavy-load vertical rigidity, large in vertical deformation, high in comfort and stability, capable of preventing creep and achieving soft stop and the like.

To solve the aforesaid problems, the following technical solutions can be adopted.

An emergency air spring assembly comprises an upper cover plate, an air bag, an upper end plate and a lower end plate. An outer periphery of the upper end plate is connected with an outer periphery of the lower end plate through the air bag. An hourglass elastomer is connected between the upper cover plate and the upper end plate. A plurality of steel springs are arranged between the upper cover plate and the upper end plate in the circumferential direction of the hourglass elastomer in a pressing mode.

As further improvement of the above technical solution.
Preferably, the hourglass elastomer comprises a low-position part, a high-position part and a partition plate. The partition plate is fixedly installed between the low-position part and the high-position part. A top portion of the high-position part and the upper cover plate are in sealing connection. A bottom portion of the low-position part and the upper end plate are in sealing connection.

Preferably, a bottom part of the upper cover plate is provided with a plurality of stop collars along the circumferential direction, and a top part of the upper end plate is provided with multiple limiting columns along the circumferential direction. Each of the limiting columns is mutually sleeved with a corresponding one of the stop collars by clearance fit, or by connection with friction sleeve, so as to reduce a sliding friction force. Each of the steel springs is sleeved on an outer periphery of the corresponding one of the stop collars and a corresponding one of the limiting columns.

Preferably, a top part of each of the limiting columns is provided with an anti-release table for preventing withdrawal of the stop collar, and the anti-release table is fastened with the limiting column by bolts.

Preferably, the top part of the upper end plate is provided with a limiting table on an outer periphery of the steel spring.

Preferably, a bottom part of the upper end plate is provided with a rubber elastomer, and a top part of the lower end plate is provided with a wearing plate which contacts the rubber elastomer in a deflated state.

Preferably, a transverse stop elastomer is vulcanized on the rubber elastomer as transverse soft stop in the deflated state.

Preferably, the top part of the lower end plate is provided with transverse stop tables on both sides of the wearing plate, and both sides of the rubber elastomer are provided with transverse stop slots which are coordinated with the transverse stop tables.

Preferably, a bottom part of an outer peripheral face of the upper end plate is provided with a retaining ring. One end of the air bag is buckled with the retaining ring, and the other end of the air bag is in self-sealing connection with the lower end plate.

Compared with the prior art, the invention has the following advantages.

The emergency air spring assembly of the present invention comprises the upper cover plate, the air bag, the upper end plate and the lower end plate. The outer periphery of the upper end plate is connected with the outer periphery of the lower end plate through the air bag. The hourglass elastomer is connected between the upper cover plate and the upper end plate. The steel springs are arranged between the upper cover plate and the upper end plate in the circumferential direction of the hourglass elastomer in a pressing mode. In this structure, the steel springs are provided outside of the hourglass elastomer in the circumferential direction to form a parallel structure which is simple in structure and convenient to install. Moreover, each steel spring initially forms the pre-compression, and the parallel structure with pre-compression can reduce creep of the hourglass elastomer, decrease the nonlinearity, and improve the dynamic displacement capability, so as to greatly reduce the heavy-load vertical rigidity of the secondary spring, and to improve the comfort of a heavy-load train, thereby providing transverse rigidity for the system in the deflated state to act as transverse soft stop, and meanwhile realize vertical rigid contact to act as vertical hard stop.

BRIEF DESCRIPTION OF THE DRAWINGS

FIG. 1 is a structure diagram of the present invention.

DESCRIPTION OF THE EMBODIMENTS

The present invention will be further clarified based on the following FIGURES and embodiments.

As shown in FIG. 1, an embodiment of the emergency air spring assembly in the present invention comprises an upper cover plate 1, an air bag 2, an upper end plate 3 and a lower end plate 4. An outer periphery of the upper end plate 3 is connected with an outer periphery of the lower end plate 4 through the air bag 2. An hourglass elastomer 5 is connected between the upper cover plate 1 and the upper end plate 3. A plurality of steel springs 6 are arranged between the upper cover plate 1 and the upper end plate 3 in a circumferential direction of the hourglass elastomer 5 in a pressing mode. In this structure, multiple steel springs 6 are provided outside of the hourglass elastomer in the circumferential direction to form a parallel structure which is simple in structure, and is convenient to install. Moreover, each of the steel spring 6 initially forms the pre-compression, and the parallel structure with pre-compression can reduce creep of the hourglass elastomer 5, so as to decrease the nonlinearity, and improve the dynamic displacement capability, and to greatly reduce the heavy-load vertical rigidity of the secondary spring, and improve the comfort of a heavy-load train, thereby providing transverse rigidity for the system in a deflated state to act as transverse soft stop.

In this embodiment, the sand clock elastomer 5 comprises a low-position part 51, a high-position part 52 and a partition plate 53. A partition plate 53 is fixedly installed between the low-position part 51 and the high-position part 52. A top portion of the high-position part 52 and the upper cover plate 1 are in sealing connection. A bottom portion of the low-position part 51 and the upper end plate 3 are in sealing connection. In the structure, the provision of the low-position part 51 and the high-position part 52 makes the overall elevation of the hourglass elastomer 5 increase, i.e., to greatly decrease the vertical rigidity of the secondary spring at heavy loads, and improve the comfort of the secondary spring at heavy loads. In addition, the low-position part 51 is separated from the high-position part 52 by the partition plate 53, and the transverse stability increases while the elevation increases. Moreover, the top portion of the high-position part 52 and the upper cover plate 1 are in sealing connection, and the bottom portion of the low-position part 51 and the upper end plate 3 are in sealing connection to prevent air leakage, so that the hourglass elastomer 5 can provide damping for the system, in order to effectively attenuate the vibration of the system.

In this embodiment, a bottom part of the upper cover plate 1 is provided with a plurality of stop collars 11 along the circumferential direction, and a top part of the upper end plate 3 is provided with multiple limiting columns 31 along the circumferential direction. Each of the limiting columns 31 is mutually sleeved with a corresponding one of the stop collars 11, and each of the steel springs 6 is sleeved on an outer periphery of the corresponding one of the stop collars 11 and a corresponding one of the limiting columns 31. The stop collar 11 is used in conjunction with the limiting column 31, so as to make the upper cover plate 1 move up and down, and restrict and limit the transverse displacement to prevent transverse deformation.

In this embodiment, a top part of the limiting column 31 is provided with an anti-release table 311 for preventing withdrawal of the stop collar 11, and the anti-release table 311 is fastened with the limiting column 31 by bolts. The anti-release table 311 is used for preventing the stop collar 11 from removing out from the top part of the limiting column 31 during rising, so as to improve the reliability of the whole structure.

In this embodiment, the top part of the upper end plate 3 is provided with a limiting table 32 on an outer periphery of the steel spring 6. The limiting table 32 is disposed to transversely restrict and limit the steel spring 6, so as to prevent transverse deformation.

In this embodiment, a bottom part of the upper end plate 3 is provided with a rubber elastomer 33, and a top part of the lower end plate 4 is provided with a wearing plate 41 which contacts the rubber elastomer 33 in the deflated state. In the deflated state, the rubber elastomer 33 and the wearing plate 41 are in hard contact to restrict the vertical displacement of the upper end plate 3 and the lower end plate 4. A transverse stop elastomer 331 is vulcanized on the rubber elastomer 33, and the transverse stop elastomer 331 is used as transverse soft stop in the deflated state.

In this embodiment, the top part of the lower end plate 4 is provided with transverse stop tables 42 on both sides of the wearing plate 41, and both sides of the rubber elastomer 33 are provided with transverse stop slots 332 which are coordinated with the transverse stop tables 42. In the deflated state, after a train slides a certain distance, the transverse stop table 42 of the lower end plate 4 is in contact with the transverse stop slot 332 of the rubber elastomer 33, thus the rubber elastomer 33 provides transverse rigidity and soft stop for the system, to draw back the train when passing through the small curve, and ensure the safety of the train in the deflated state.

In this embodiment, a bottom part of an outer peripheral face of the upper end plate 3 is provided with a retaining ring 34. One end of the air bag 2 is buckled with the retaining ring 34, and the other end of the air bag is in self-sealing connection with the lower end plate 4. In this structure, the small opening of the air bag 2 is in self-sealing connection with the lower end plate 4, to prevent air leakage.

While the preferred embodiments of the present invention have been disclosed as above, they are not intended to limit the present invention. Any person skilled in the art, without departing from the scope of the technical solution of the present invention, can take advantage of the above-described technical content to make many possible variations and modifications of the present invention, or equivalent embodiments with equivalent change. Therefore, all the contents without departing from the technical solution of the present invention, based on any simple modification, equivalent variations and modifications of the present invention made by the technical essence of the present invention for the above embodiment, would fall within the protection scope of the technical solution of the present invention.

What is claimed is:

1. An emergency air spring assembly, comprising an upper cover plate, an air bag, an upper end plate and a lower end plate, wherein an outer periphery of the upper end plate is connected with an outer periphery of the lower end plate through the air bag; an hourglass elastomer is connected between the upper cover plate and the upper end plate; a plurality of steel springs are arranged between the upper cover plate and the upper end plate in a circumferential direction of the hourglass elastomer in a pressing mode, wherein a bottom art of the upper end plate is provided with a rubber elastomer, and a top part of the lower end plate is provided with a wearing plate which contacts the rubber elastomer in a deflated state, a transverse stop elastomer is vulcanized on the rubber elastomer as a transverse soft stop in the deflated state.

2. The emergency air spring assembly according to claim 1, wherein the hourglass elastomer comprises a low-position part, a high-position part and a partition plate; the partition plate is fixedly installed between the low-position part and the high-position part; a top portion of the high-position part and the upper cover plate are in sealing connection; a bottom portion of the low-position part and the upper end plate are in sealing connection.

3. The emergency air spring assembly according to claim 2, wherein a bottom part of the upper cover plate is provided with a plurality of stop collars along the circumferential direction, and a top part of the upper end plate is provided with a plurality of limiting columns along the circumferential direction; each of the limiting columns is mutually sleeved with a corresponding one of the stop collars by clearance fit, or by connection with a friction sleeve, so as to reduce a sliding friction force; each of the steel springs is sleeved on an outer periphery of the corresponding one of the stop collars and a corresponding one of the limiting columns.

4. The emergency air spring assembly according to claim 3, wherein a top part of each of the limiting columns is provided with an anti-release table for preventing withdrawal of each stop collar, and each anti-release table is fastened with each limiting column by bolts.

5. The emergency air spring assembly according to claim 4, wherein the top part of the upper end plate is provided with a limiting table on an outer periphery of each steel spring.

6. The emergency air spring assembly according to claim 5, wherein a bottom part of an outer peripheral face of the upper end plate is provided with a retaining ring; one end of the air bag is buckled with the retaining ring, and the other end of the air bag is in self-sealing connection with the lower end plate.

7. The emergency air spring assembly according to claim 2, wherein a bottom part of an outer peripheral face of the upper end plate is provided with a retaining ring; one end of the air bag is buckled with the retaining ring, and the other end of the air bag is in self-sealing connection with the lower end plate.

8. The emergency air spring assembly according to claim 3, wherein a bottom part of an outer peripheral face of the upper end plate is provided with a retaining ring; one end of the air bag is buckled with the retaining ring, and the other end of the air bag is in self-sealing connection with the lower end plate.

9. The emergency air spring assembly according to claim 4, wherein a bottom part of an outer peripheral face of the upper end plate is provided with a retaining ring; one end of the air bag is buckled with the retaining ring, and the other end of the air bag is in self-sealing connection with the lower end plate.

10. The emergency air spring assembly according to claim 1, wherein the top part of the lower end plate is provided with transverse stop tables on both sides of the wearing plate, and both sides of the rubber elastomer are provided with transverse stop slots which are coordinated with the transverse stop tables.

11. The emergency air spring assembly according to claim 10, wherein a bottom part of an outer peripheral face of the upper end plate is provided with a retaining ring; one end of the air bag is buckled with the retaining ring, and the other end of the air bag is in self-sealing connection with the lower end plate.

12. The emergency air spring assembly according to claim 1, wherein a bottom part of an outer peripheral face of the upper end plate is provided with a retaining ring; one end of the air bag is buckled with the retaining ring, and the other end of the air bag is in self-sealing connection with the lower end plate.

* * * * *